US005771180A

United States Patent [19]

Culbert

[11] Patent Number: 5,771,180

[45] Date of Patent: Jun. 23, 1998

[54] REAL TIME CLOCK AND METHOD FOR PROVIDING SAME

[75] Inventor: Michael F. Culbert, San Jose, Calif.

[73] Assignee: Apple Computer, Inc., Cupertino, Calif.

[21] Appl. No.: 315,938

[22] Filed: Sep. 30, 1994

[51] Int. Cl.$^{6}$ .................................................... G01K 15/00

[52] U.S. Cl. .................... 364/557; 364/569; 364/571.03; 364/571.04; 364/571.05; 331/65; 331/66; 331/158; 331/176

[58] Field of Search .................................... 364/557, 569, 364/571.03–571.05; 331/65, 66, 158, 176

[56] References Cited

U.S. PATENT DOCUMENTS

| | | | |
|---|---|---|---|
| 3,999,169 | 12/1976 | Perschy | 340/172.5 |
| 4,297,657 | 10/1981 | Frerking | 331/176 |
| 4,303,850 | 12/1981 | Juhasz et al. | 235/92 FP |
| 4,380,745 | 4/1983 | Barlow et al. | 331/176 |
| 4,454,483 | 6/1984 | Baylor | 331/176 |
| 4,513,259 | 4/1985 | Frerking | 331/176 |
| 4,563,748 | 1/1986 | Hanaoka | 364/557 |
| 4,644,482 | 2/1987 | Juanarena | 364/558 |
| 4,708,491 | 11/1987 | Luitje | 368/156 |
| 4,893,097 | 1/1990 | Zwack | 331/176 |
| 4,906,944 | 3/1990 | Frerking | 331/176 |
| 4,910,473 | 3/1990 | Niwa | 331/176 |
| 4,922,212 | 5/1990 | Roberts et al. | 331/176 |
| 5,081,431 | 1/1992 | Kubo et al. | 331/176 |
| 5,428,319 | 6/1995 | Marvin et al. | 331/176 |
| 5,446,696 | 8/1995 | Ware et al. | 365/222 |
| 5,473,289 | 12/1995 | Ishizaki et al. | 331/176 |
| 5,542,113 | 7/1996 | Fink et al. | 455/4 |
| 5,546,363 | 8/1996 | Funaki et al. | 368/200 |

*Primary Examiner*—James P. Trammell
*Assistant Examiner*—Hien Vo
*Attorney, Agent, or Firm*—Beyer & Weaver, LLP

[57] ABSTRACT

A real time clock includes an oscillator, a digital counter, a temperature sensor, and a digital processor. The digital processor can read the temperature measured by the temperature sensor and utilize this information to generate an adjustment value for the digital counter. The digital counter is coupled to the digital processor and has an adjustment stage which the digital processor writes into in order to compensate for any oscillator error due to temperature variation. The digital processor may also be coupled to memory storing a temperature adjustment look-up table for use in generating the adjustment value. A method of the present invention includes the initial steps of generating an adjustment look-up table and storing it in non-volatile memory. A method of the present invention further includes the ongoing steps of measuring an ambient temperature, generating an adjustment value, adjusting the digital counter to improve the accuracy of the real time clock, and storing a new alarm time for a future adjustment.

30 Claims, 7 Drawing Sheets

REAL TIME CLOCK AND METHOD FOR PROVIDING SAME

BACKGROUND OF THE INVENTION

The present invention relates generally to computer systems, and more particularly to real time clocks for portable computer systems.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Computerized personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer operating as personal organizer or "Personal Digital Assistant" (PDA) is made by Apple Computer, Inc. of Cupertino, Calif. under the trademark Newton™.

Many of the functions of a PDA require an accurate real-time clock (RTC), i.e., a clock which provides the PDA with information concerning the actual time of day and the date. For example, to operate properly, the calendar function, the clock display, and various timer functions of a PDA require an accurate real-time clock. Two primary factors of concern when designing an RTC for a PDA, or any system utilizing an RTC, are accuracy and power conservation. The accuracy requirement for the PDA is typically the same as a personal quartz watch, that is, ±1 to ±5 seconds per month. Additionally, the PDA is usually battery powered. Thus, power conservation is important, especially with regards to continuously operating processes such as the RTC.

A standard RTC includes an oscillating circuit coupled to a digital counter. The digital counter has a very wide register, i.e. 32 bits wide, which stores the count. A typical prior art oscillator, as illustrated in FIG. 1, includes a crystal, an inverting amplifier, capacitors, resistors, and a Schmidt trigger. As illustrated in FIG. 1*a,* the oscillator of FIG. 1 will produce a sine wave at node A. The primary output of the oscillator comes from node B and is a continuous square wave signal with a known frequency as shown in FIG. 1*b*. The counter (not shown) counts the pulses in the square wave, thus providing a direct relation between the value in the counter and the length of time the RTC has been running. The RTC is typically incorporated into a larger system, and a system controller or central processing unit is utilized to load an initial counter value, and from then on, interpret a meaningful time and date from the counter value. For example, an RTC can be set with a value equal to the number of seconds since an arbitrary start date, such as Jan. 4, 1905.

The accuracy of the aforementioned oscillator and, consequently, the RTC are directly related to the operating environment, in some cases being especially dependent upon ambient temperature. As is well known to those skilled in the art of oscillator circuit design, higher frequency oscillators tend to be less temperature dependent and are therefore more accurate in an environment with varying temperature conditions. The solid curve of FIG. 1*c* is a representative prior art graph of oscillator frequency versus temperature, with temperature ranging from approximately 0° C. to 80° C. In the case of lower frequency oscillators, this curve corresponds to a frequency variation of approximately ±10%. For example, an RTC utilizing an oscillator with a frequency of 32.768 kilohertz (kHz) may achieve an accuracy of ±45 seconds per month under typical room temperature (e.g. 25° C.) variations. In contrast, the RTC utilizing an oscillator in the frequency range of 4–6 megahertz (MHz) may achieve an accuracy of ±5 seconds per month under similar conditions. Unfortunately, accuracy comes at the expense of power use. Under similar conditions, the RTC utilizing an oscillator with the frequency of 32.768 kHz will utilize picoamps of power, while the RTC utilizing an oscillator in the frequency range of 4–6 MHz will utilize microamps of power. Obviously, higher frequency oscillator will drain the PDA's battery at a much faster rate than the lower frequency oscillator.

One prior solution simply calibrates the RTC to match its primary operating temperature. In certain situations this solution is satisfactory. For example, one can assume that a standard wristwatch will spend the majority of its life operating in an ambient temperature near 98.6° F. (body temperature). By calibrating the RTC to operate accurately at this temperature, accuracy in the range of ±1 to ±5 seconds per month can be achieved. While this reduces power consumption, these watches typically come with a disclaimer that the accuracy is only guaranteed in a specified temperature range, which corresponds to the watches being worn. Unfortunately, the wide variety of operating temperatures experienced by the typical PDA prohibit use of this solution.

Another prior attempt involves the use of two oscillators. A primary oscillator is a low frequency, temperature dependent, power conserving oscillator which runs constantly. A secondary oscillator is a high cost, precision, high frequency, relatively temperature independent, power hungry oscillator which is turned on intermittently to calculate the error in the primary oscillator. Once the error is known, the system controller can recalibrate the counter and thereafter compensate for the error. Accuracy is improved and power use is reduced. But, this solution still wastes more power than the single, low frequency oscillator RTC, introduces the added complexity of a two oscillator RTC, and uses precious circuit board space.

SUMMARY OF THE INVENTION

The present invention teaches a method and apparatus for providing a real time clock with improved accuracy and lower power consumption. More specifically, the real time clock includes an oscillator, a digital counter, a temperature sensor, and a digital processor. The digital counter counts the pulses of the oscillator signal and stores this count in a real time counter register. The digital processor is coupled to memory storing a temperature adjustment look-up table. The digital processor utilizes the temperature measurement and the look-up table to generate a counter adjustment signal which serves to compensate for oscillator error due to temperature variation.

According to one aspect of the present invention, the digital counter includes an adjustment stage, a counter register stage, and an alarm stage. The adjustment stage is responsive to the oscillator and the counter adjustment signal, which includes a fractional counter adjustment signal and an integer adjustment signal, to produce a fully adjusted signal. The fully adjusted signal operates as a clocking signal to the counter register stage, which is utilized by the digital processor to produce a time and date. The fully adjusted signal has been adjusted to compensate for oscillator error due to temperature variation. The alarm stage compares an alarm value loaded by the digital processor and generates an alarm signal when the alarm value matches the value in the counter register.

In accordance with another aspect of the present invention, a computer system with a real time clock is provided. The computer system includes a central processing unit (CPU), digital memory, an oscillator, a digital counter, and a temperature measurement circuit. The digital counter counts the pulses of the oscillator and is also responsive to a counter adjustment signal which the CPU generates based on the ambient temperature.

A method in accordance with the present invention includes the steps of developing an oscillator signal, counting the cycles of the oscillator signal with a digital counter, receiving an alarm signal which causes the system to adjust the digital counter. Adjusting the digital counter includes the steps of measuring the ambient temperature, retrieving an nominal reference temperature from non-volatile memory, generating a counter adjustment signal based upon the ambient temperature deviation from the reference temperature, and adjusting the digital counter.

These and other advantages of the present invention will become apparent upon reading the following detailed descriptions and studying the various figures of the drawings.

DETAILED DESCRIPTION OF THE PREFERRED EMBODIMENTS

Figure 1:
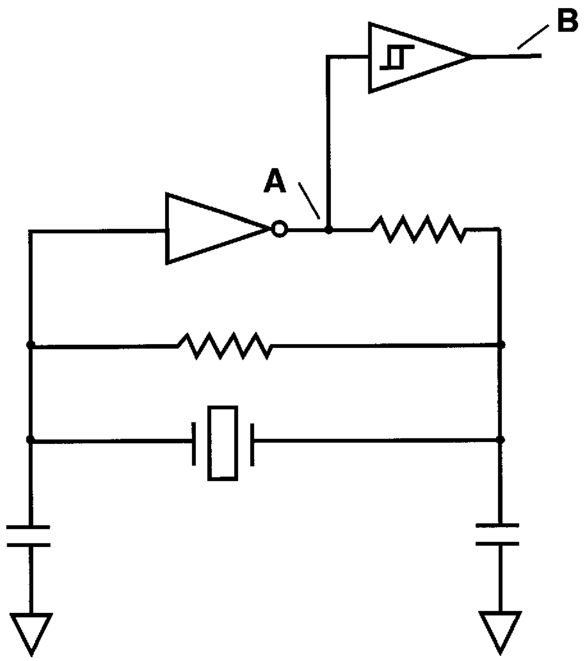
Fig 1 (Prior art)
FIG. 1 is a schematic of an oscillator of the prior art.
Figure 1A:
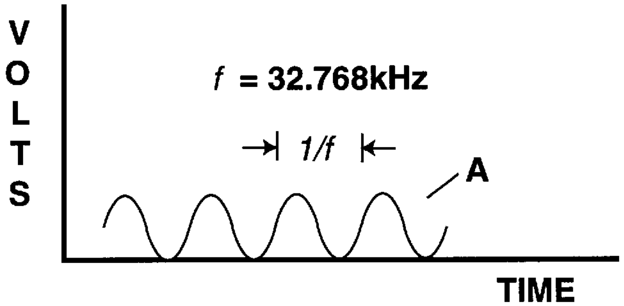
Fig 1a (Prior art)
FIG. 1*a* is a graph of the wave form of the oscillator measured at node A of FIG. 1.
Figure 1B:
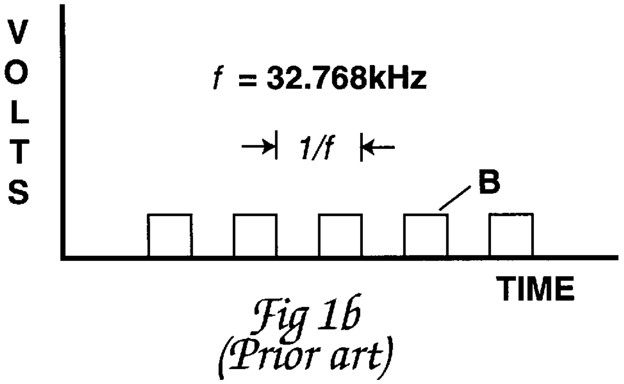
Fig 1b (Prior art)
FIG. 1*b* is a graph of the wave form of the oscillator measured at node B of FIG. 1.
Figure 2:
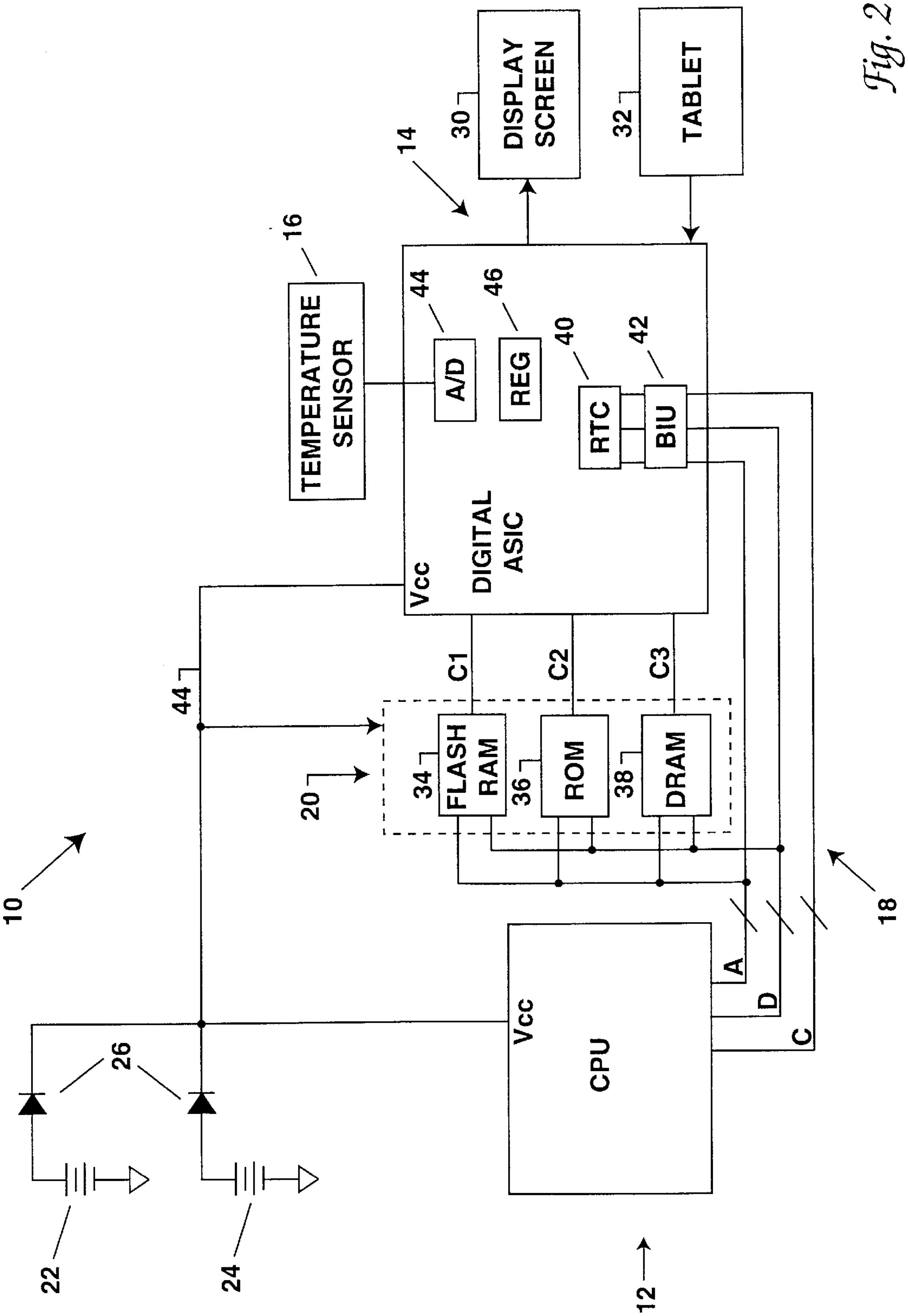
FIG. 2 is a block diagram of a computer system in accordance with the present invention.

FIGS. 1 and 1*a*–1*c* were used to discuss the prior art. In FIG. 2, a computer system 10 in accordance with the present invention includes a central processing unit (CPU) 12, a system controller 14, a temperature sensor 16 and a communication bus 18. The computer system may optionally include system memory 20, a main battery 22, a backup battery 24, protection diodes 26, a display screen 30, and a tablet 32. In the embodiment of FIG. 1, the communication bus 18 comprises a control bus C, a data bus D, and an address bus A. In one embodiment the system memory 20 comprises non-volatile read/write memory (flash RAM) 34, non-volatile read only memory (ROM) 36, and volatile read/write memory (RAM) 38.

The CPU 12, flash RAM 34, ROM 36, and RAM 38 are preferably commercially available integrated circuits ("chips") available from a variety of sources. In one embodiment the CPU 12 is a single chip digital processor. ROM 36 contains the basic operating system (OS) instructions for the computer system, RAM 38 is used for temporary memory, and the non-volatile read/write memory 34 is used for permanent storage.

In one embodiment the controller 14 is an application specific integrated circuit (ASIC), designed to include a real time clock (RTC) 40, a bus interface unit (BIU) 42, a analog-to-digital (AID) converter 44, and a temperature register 46. The RTC is coupled with an oscillator similar to what is illustrated in FIG. 2 of the prior art. The BIU 42 simply allows the internal components of the ASIC 14 to communicate with other components of the computer system via the communication bus 18. The A/D converter 44 measures an analog signal produced by the temperature sensor 16, the magnitude of this signal corresponding to the ambient temperature, and writes a corresponding digital value into the temperature register 46. In one embodiment, the temperature sensor 16 is a circuit which includes a thermistor. Temperature sensing devices such as a thermocouple or an active integrated circuit sensor could also be used in this application.

The present invention preferably uses a conventional oscillator as shown in FIG. 1. The components of the oscillator are chosen such that the oscillator signal has a nominal frequency of 32.678 kHz at a temperature of 25° C. This frequency oscillator is a computer industry standard, and is therefore inexpensive and readily available. Oscillators in this frequency range have good power conservation characteristics but, as discussed in the background, are temperature dependent.

Figure 3:
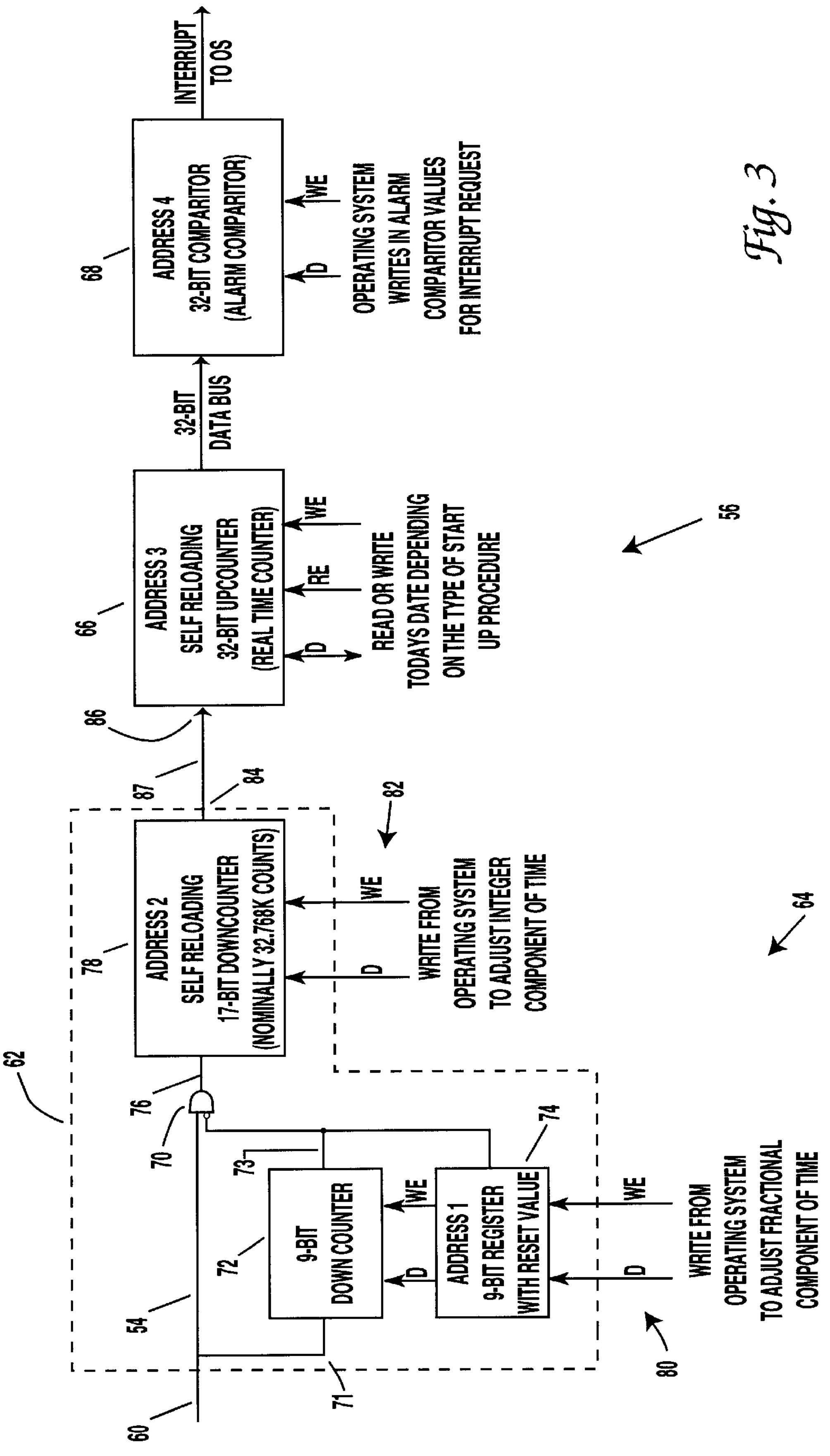
FIG. 3 is a block diagram of a real time counter circuit in accordance with the present invention.
Figure 1C:
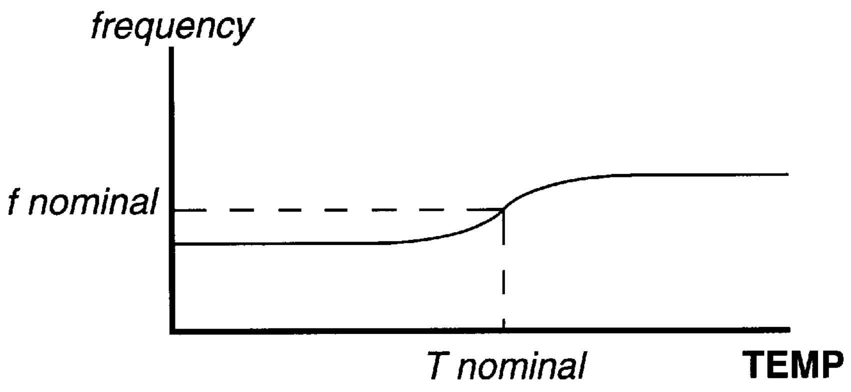
Fig 1c (Prior art)
FIG. 1*c* is a graph of the frequency characteristics of the oscillator of FIG. 1 versus temperature.

The RTC of the present invention includes the real time counter 56 as shown in FIG. 3. The real time counter 56 includes a counter adjustment stage 62, a counter register stage 66, and an alarm stage 68.

The counter adjustment stage 62 includes a two input AND gate 70, a 9-bit downcounter 72, a reset value 9-bit register 74, a self reloading 17-bit downcounter 78. A counter adjustment input 64 includes two components, a fractional adjustment input 80 coupled to the 9-bit register 74, and an integer adjustment input 82, coupled to the 17-bit downcounter 78.

The counter 56 includes an index count input, an overflow output, and a reset value input. The downcounter decreases its count value by unity on every positive transition of the signal on the index count input. The overflow output is zero until the downcounter counts past zero, at which point the overflow output becomes unity. When a value is entered into the reset value input, the overflow output is set to zero and the counter continues from the reset value. In a self reloading downcounter, after indexing past the set point, the counter automatically reloads itself and resets the overflow output.

Figure 3A:
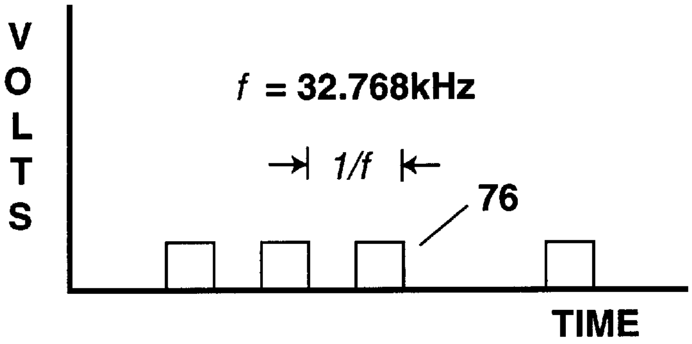
FIG. 3*a* is a graph of the wave form of the fractionally adjusted signal 76 of FIG. 3.

Within the counter adjustment stage 62, the oscillator input 60 is coupled to both an input of the AND gate 70 and the index count input 71 of the 9-bit downcounter 72. The 9-bit downcounter overflow output 73 is coupled to the inverting input of the AND gate 70 and to the reset value 9-bit register 74. With the logic arranged thus so, the output of the AND gate 70 is a fractionally adjusted signal 76 which mimics the oscillator signal 54 as long as the downcounter 72 is indexing towards zero. When the downcounter reaches zero, the overflow output goes high causing the output signal 76 to skip a pulse as illustrated in FIG. 3*a*. Simultaneously, the overflow output enables the reset value 9-bit register 74 to load its value into the 9-bit downcounter 72. This resets the 9-bit downcounter 72, sets the overflow output 73 low, and starts the mimic process at the beginning, thus perpetuating a periodic cycle.

The operation of the adjustment stage 62 is illustrated by way of example. Assume the ambient temperature is above the nominal temperature $T_{nominal}$ marked on FIG. 1*c*. This corresponds to the oscillator cycling at a frequency higher than expected and, if no adjustment is made, the 17-bit downcounter would have an inaccurately high count. The aforementioned operation of the 9-bit downcounter 72 and reset value register 74 causes the 17-bit downcounter to periodically miss a pulse of the oscillator signal 54, and, if the value in the reset value register 74 is chosen appropriately, the count value in the 17-bit downcounter would be accurate. If the 17-bit downcounter reset value is chosen to produce a 1 Hz output signal, then any adjustments made to the oscillator signal 54 in this manner will be fractional adjustments, that is, adjustments which are a fraction of one second.

Figure 3B:
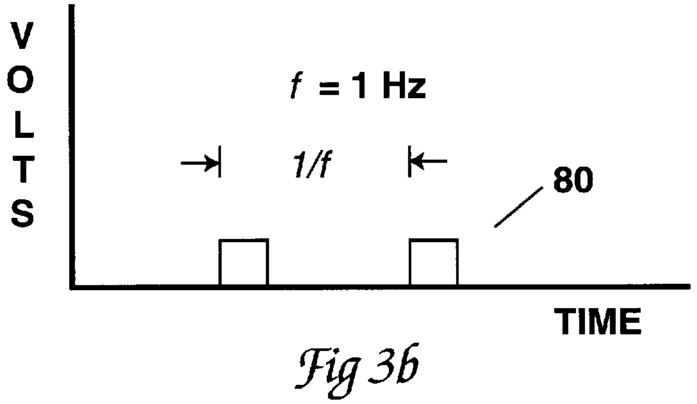
FIG. 3*b* is a graph of the wave form of the fully adjusted signal 80 of FIG. 3.

The fractionally adjusted signal 76 drives the index count input 77 of the self reloading 17-bit downcounter 78. Upon reaching zero, the 17-bit downcounter 78 will simultaneously reload itself and toggle its overflow output to provide a fully adjusted signal 84. By "fully adjusted" it is meant that the signal is as adjusted as much as it will be adjusted by adjustment stage 62. The self reloading value for the 17-bit downcounter 78 is set to correspond with the nominal frequency of the oscillator such that the fully adjusted signal 84 is a useful clock cycle for the real time counter 66. In a preferred embodiment, this nominal value is chosen to produce an output signal 84 with a frequency of 1 Hz, as shown in FIG. 3*b*.

To make fractional adjustments to the frequency the OS can write directly to the reset value 9-bit register 72 through the fractional adjustment input 80. Then at the next overflow, the new reset value will be loaded into the 9-bit downcounter 72. Likewise, to make integer adjustments to the frequency, the OS can write directly into the self reloading 17-bit downcounter through the integer adjustment input 82.

The fully adjusted signal 84 is coupled to the index count input 86 of the real time counter 66, which, in a preferred embodiment, is a self reloading 32-bit upcounter. Since a fully adjusted signal 84 with a frequency of 1 Hz corresponds to one cycle per second, the integer value stored in the real time counter 66 corresponds to seconds. The OS has both read and write access to the value in the real time counter 66, thus able to read and produce a meaningful interpretation, or write a meaningful value into the register.

The real time counter 66 has a 32-bit output which is coupled to the 32-bit alarm comparator 68. The 32-bit comparitor 68 monitors the value of the real time counter 66 and sends an alarm signal to the OS implemented on the computer system 10 when the value loaded into the comparitor 68 equals the value in the real time counter 66. The OS can write a new time for an alarm request directly into the 32-bit alarm comparitor.

Figure 4:
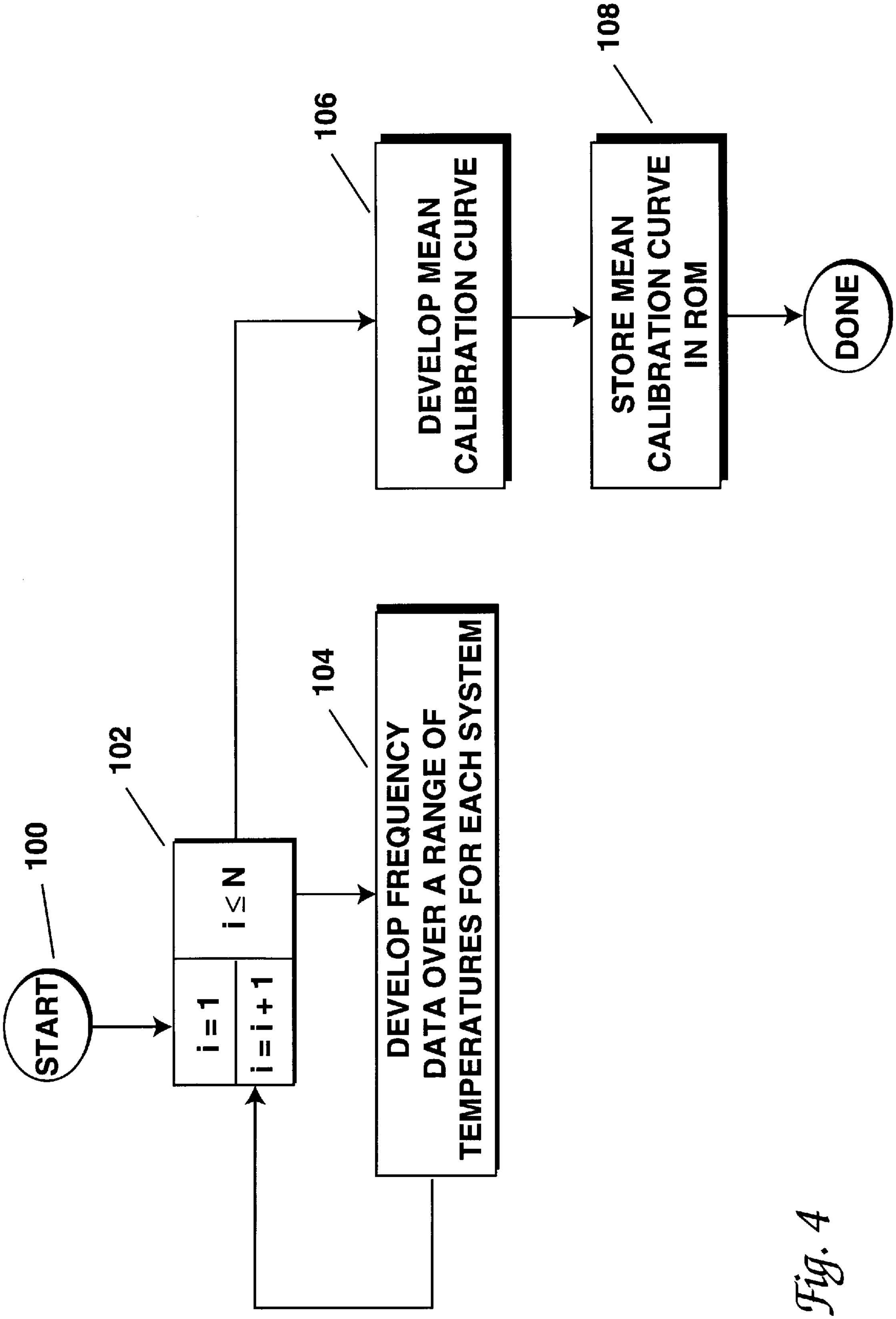
FIG. 4 is a flow diagram of the process for generating a temperature adjustment look-up table.

To enable the OS to effectively utilize the counter adjustment stage 62 and produce a more accurate RTC, statistical oscillator frequency data over a range of temperatures is compiled into a temperature adjustment table and stored in ROM 36 of the computer system 10. The process for compiling this data is shown in FIG. 4. In a first step 100, a statistically significant sample subgroup is selected from a large group of computer systems and each member of the sample attached to a frequency sensor. In step 102, a looping process begins wherein the frequencies of each member of the sample group will be measured at N different temperatures between 0° C. and 80° C. When step 100 first gives control to step 102, the index variable i is set to unity and the ambient temperature is set to $T_1$. Then, in step 104, the frequencies of the sample group are measured and recorded. Control then goes back to step 102, where unity is added to the index variable i. If i is less than or equal to N, the looping process continues by setting the ambient temperature to $T_i$ and passing control to step 104, otherwise, control is passed to step 106. In step 106, the data developed in steps 102 and 104 is processed and condensed into a mean calibration curve. This curve will have a shape similar to the temperature versus frequency curve of FIG. 2*c*. In the final step 108, this mean calibration curve is stored as a temperature adjustment table in the ROM 36 of each individual computer system.

Figure 5:
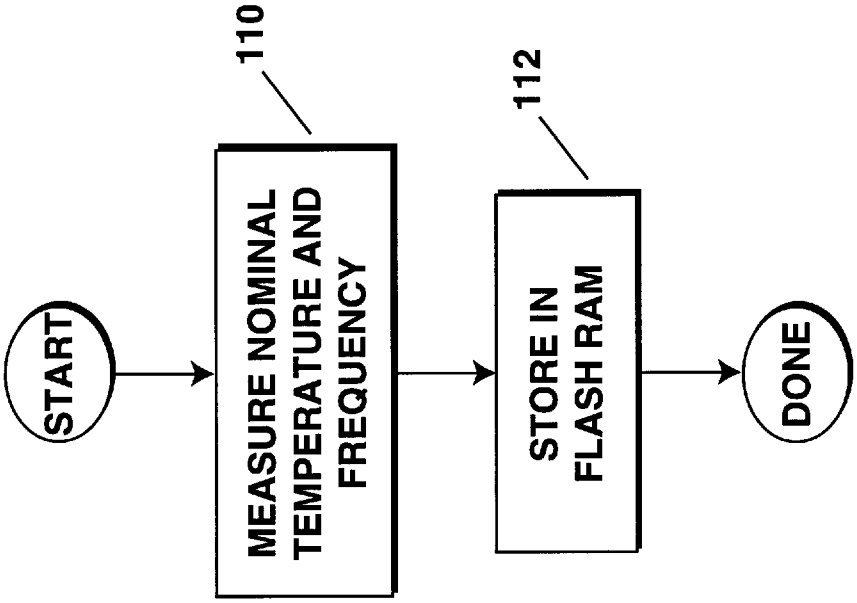
FIG. 5 is a flow diagram for measuring and storing the nominal temperature and frequency.

FIG. 5 shows the final steps necessary to prepare each RTC for use within the computer system 10. In a step 110, the nominal frequency and temperature of the specific RTC being calibrated are measured. Then in step 112, this data is stored in the non-volatile read/write memory 34 of the PDA. These steps provide the OS with a reference point for performing a future adjustment of the RTC.

Figure 6:
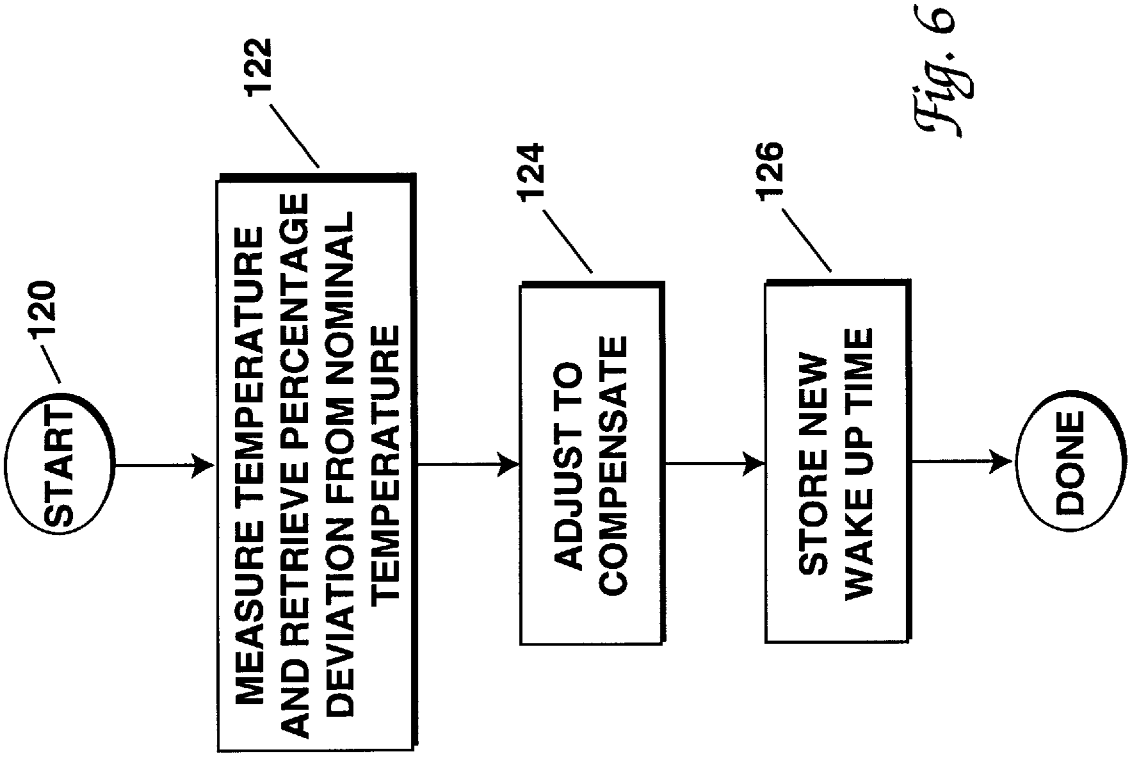
FIG. 6 is a flow diagram for adjusting the real time counter for frequency error.

A flow diagram of the RTC adjustment process is shown in FIG. 6. In a first step 120, the OS receives an adjust RTC alarm signal ("wake up") from the alarm comparitor 68 of FIG. 3. In a next step 122, the OS retrieves the current ambient temperature from the temperature register 46 and calculates the percent deviation from the nominal temperature stored in non-volatile read/write memory 34. Then, in step 124, the OS adjusts the real time counter to compensate for oscillator error. And in a final step 126, the OS stores a new wake up time in the alarm comparitor.

Figure 7:
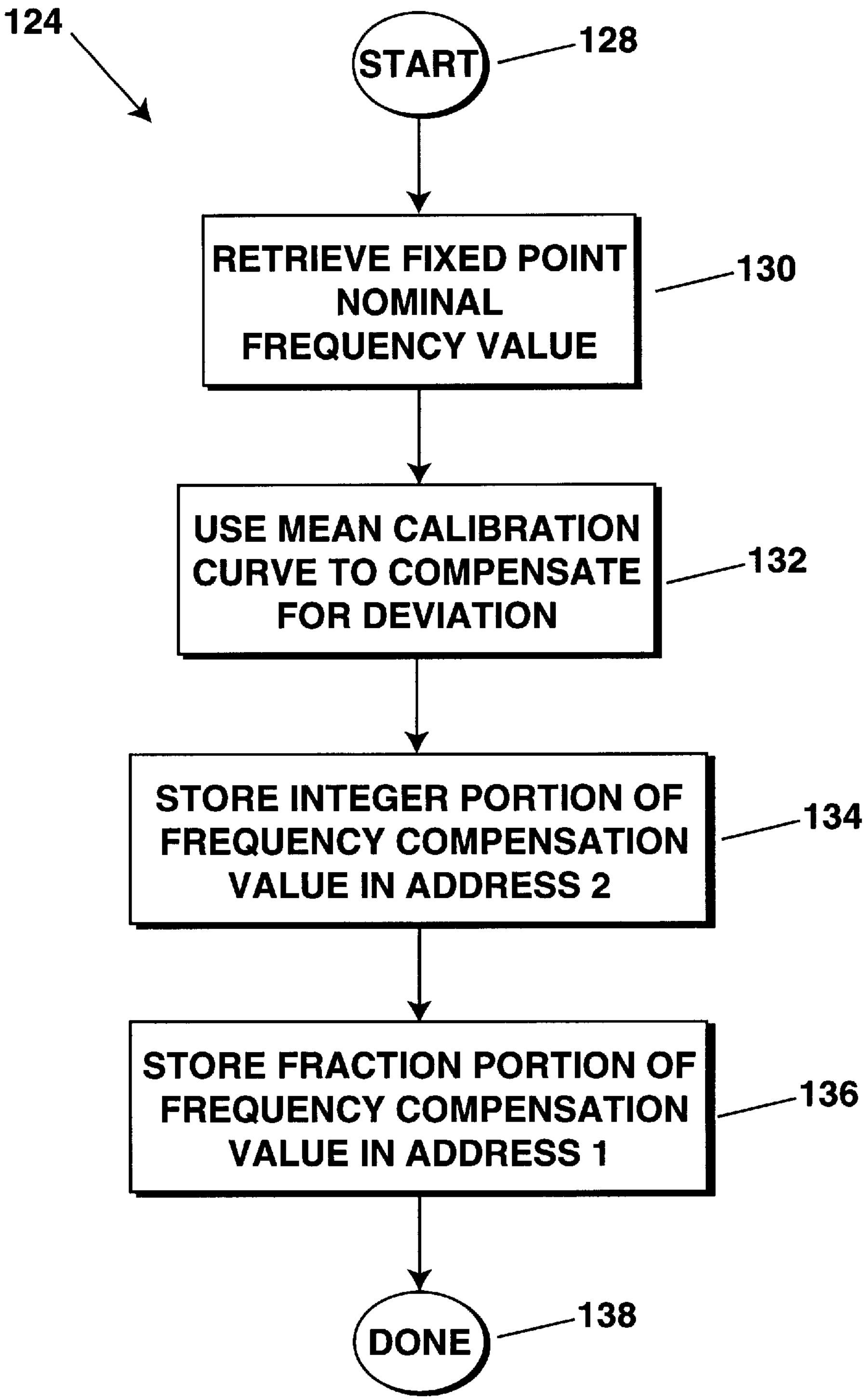
FIG. 7 is a detailed flow diagram for step 124 of FIG. 6.

FIG. 7 illustrates step 124 of FIG. 6 in greater detail. The process begins at step 128 and, in a step 130, the OS retrieves the nominal reference frequency value stored in non-volatile read/write memory 34. Then, in a step 132, the OS uses the current and nominal reference temperatures found in step 122, the nominal reference frequency, and the temperature adjustment look up table to calculate a frequency compensation value. In one embodiment, the frequency compensation value is comprised of two portions, an integer and a fractional portion. In this embodiment, in step 134, the integer portion of the frequency compensation is stored in the 17-bit downcounter 78, and in step 136 the fractional portion is stored in the reset value 9-bit register 74. In a final step 138, control is passed to step 126 of FIG. 6. It should be appreciated that splitting the compensation value into a fractional and an integer portion is not a required step of the present invention. Other configurations are conceivable which require only one adjustment input.

Implementing the previously described embodiment of the present invention on the Newton PDA produces the following results: Setting the alarm comparitor to adjust once every minute, an accuracy of ±2 seconds per month can be achieved. This adjust rate tends to shorten battery life. By adjusting once every ten minutes an accuracy of ±5 seconds per month is achieved with no noticeable effect on battery life.

While this invention has been described in terms of several preferred embodiments, there are alterations, permutations, and equivalents which fall within the scope of this invention. It should also be noted that there are many alternative ways of implementing both the process and apparatus of the present invention. Different types of oscillators, other than the one illustrated in FIG. 1, can be used. Oscillators with frequencies other than 32.768 kHz can be used.

It is therefore intended that the following appended claims be interpreted as including all such alterations, permutations, and equivalents as fall within the true spirit and scope of the present invention.

What is claimed is:

1. A real time clock comprising:

an oscillator developing an oscillator signal;

a digital counter having an oscillator input coupled to said oscillator signal, a counter adjustment input, and a real time counter register which provides a count value that can represent a current time;

a temperature measurement circuit operative to measure an ambient temperature and provide a digital temperature value; and a digital processor operative to use said temperature value to provide a counter adjustment signal, said digital processor being further operative to read said real time counter register and providing said current time.

2. A real time clock as recited in claim 1 wherein said digital counter has only a single oscillator input, and wherein said oscillator signal is provided at a single frequency.

3. A real time clock comprising:

an oscillator developing an oscillator signal, said oscillator signal provided at a frequency less than 4 megahertz (MHz);

a digital counter having only a single oscillator input coupled to said oscillator signal, a counter adjustment input, and a real time counter register which provides a count value that can represent a current time;

a temperature measurement circuit operative to measure an ambient temperature and provide a digital temperature value; and a digital processor operative to use said temperature value to provide a counter adjustment signal, said digital processor being further operative to read said real time counter register and providing said current time.

4. A real time clock as recited in claim 3 wherein said single frequency of said oscillator is less than 1 MHz.

5. A real time clock as recited in claim 3 wherein said single frequency of said oscillator is less than 100 kilohertz (kHz).

6. A real time clock as recited in claim 3 wherein said single frequency is in the range of 20–50 kHz.

7. A real time clock as recited in claim 1 wherein said temperature circuit system includes:

a temperature transducer having a temperature variable analog signal; and an analog-to-digital (A/D) converter coupled to said analog signal for providing said digital temperature value.

8. A real time clock as recited in claim 7 wherein said digital processor is further coupled to a memory storing a temperature adjustment look-up table, and wherein said digital processor is further responsive to said temperature adjustment look-up table to provide said counter adjustment signal.

9. A real time clock comprising:

an oscillator developing an oscillator signal;

a digital counter having an oscillator input coupled to said oscillator signal, a counter adjustment input, a real time counter register which provides a count value that can represent a current time, an adjustment stage, a counter register stage and an alarm stage;

a temperature measurement circuit operative to measure an ambient temperature and provide a digital temperature value; and a digital processor operative to use said temperature value to provide a counter adjustment signal, said digital processor being further operative to read said real time counter register and providing said current time.

10. A real time clock as recited in claim 9 wherein said adjustment stage is responsive to said oscillator signal and said counter adjustment signal, and wherein said counter adjustment signal includes an integer adjustment signal and a fractional adjustment signal.

11. A real time clock as recited in claim 10 wherein said adjustment stage includes a fractional adjuster responsive to said oscillator signal and said fractional adjustment signal and operative to produce a fractionally adjusted signal, and an integer adjuster responsive to said fractionally adjusted signal and said integer adjusted signal and operative to produce a fully adjusted signal.

12. A real time clock as recited in claim 11 wherein said real time counter register is coupled to said fully adjusted signal, and wherein said real time counter register is a part of a self-reloading upcounter.

13. A real time clock as recited in claim 12 wherein said self-reloading upcounter can be loaded by said digital processor with a current time value.

14. A real time clock as recited in claim 9 wherein said alarm stage comprises a comparitor for comparing said current time value with a comparison value, and for producing an alarm signal when said current time value and said comparison value have a given numerical relationship.

15. A computer system with a real time clock comprising:

a central processing unit (CPU);

digital memory coupled to said CPU;

an oscillator providing an oscillator signal;

a digital counter having an oscillator input coupled to said oscillator signal, a counter adjustment input, and a real time counter register accessible by said CPU which provides a count value that can represent a current time;

a temperature measurement circuit operative to measure an ambient temperature and provide a digital temperature value accessible by said CPU; and counter adjustment means implemented on said CPU for providing said counter adjustment signal to said digital counter in response to said digital temperature value.

16. A computer system as recited in claim 15 wherein said CPU, said digital memory, and said digital counter are coupled to a common bus.

17. A computer system as recited in claim 16 wherein said digital memory includes non-volatile memory and volatile memory.

18. A computer system as recited in claim 17 wherein said temperature measurement circuit includes:

a temperature transducer having a temperature variable analog signal; and an analog-to-digital (A/D) converter coupled to said analog signal for providing said digital temperature value.

19. A computer system as recited in claim 18 wherein said digital counter has only a single oscillator input, and wherein said oscillator signal is provided at a single frequency.

20. A computer system as recited in claim 19 wherein a temperature adjustment look-up table is stored in said non-volatile memory, and wherein said counter adjustment means utilizes said look-up table to provide said counter adjustment signal.

21. A computer system as recited in claim 20 wherein said non-volatile memory includes non-volatile read-only memory and non-volatile read/write memory, and further including calibration data stored in said non-volatile read/write memory which is further used by said counter adjustment means to provide said counter adjustment signal.

22. A computer system with a real time clock comprising:

a central processing unit (CPU);

digital memory coupled to said CPU, said digital memory including non-volatile memory and volatile memory;

a temperature adjustment look-up table stored in said non-volatile memory;

an oscillator providing an oscillator signal a single frequency;

a digital counter having only a single oscillator input coupled to said oscillator signal, a counter adjustment input, and a real time counter register accessible by said CPU which provides a count value that can represent a current time, wherein said CPU, said digital memory, and said digital counter are coupled to a common bus;

a temperature measurement circuit including a temperature transducer having a temperature variable analog signal and an analog-to-digital (A/D) converter coupled to said analog signal for providing said digital temperature value, wherein said temperature measurement circuit is operative to measure an ambient temperature and provide a digital temperature value accessible by said CPU; and counter adjustment means implemented on said CPU for providing said counter adjustment signal to said digital counter in response to said digital temperature value, wherein said counter adjustment means utilizes said look-up table to provide said counter adjustment signal.

23. A computer system as recited in claim 22 wherein said adjustment stage is responsive to said oscillator signal and said counter adjustment signal, and wherein said counter adjustment signal includes an integer adjustment signal and a fractional adjustment signal.

24. A computer system as recited in claim 23 wherein said adjustment stage includes a fractional adjuster responsive to said oscillator signal and said fractional adjustment signal and operative to produce a fractionally adjusted signal, and an integer adjuster responsive to said fractionally adjusted signal and said integer adjusted signal and operative to produce a fully adjusted signal.

25. A computer system as recited in claim 24 wherein said fractional adjuster includes a downcounter having an input coupled to said oscillator signal and an overflow signal, and a register having a first input coupled to said fractional adjustment signal and a second input coupled to said overflow signal, said register being coupled to said downcounter to load said downcounter, and a gate having said overflow signal and said oscillator signal as inputs and said fully adjusted signal as an output.

26. A computer system as recited in claim 25 wherein said real time counter register is coupled to said fully adjusted signal, and wherein said real time counter register is a part of a self-reloading upcounter.

27. A computer system as recited in claim 26 wherein said self-reloading upcounter can be loaded by said counter adjustment means with a current time value.

28. A computer system as recited in claim 27 wherein said alarm stage comprises a comparitor for comparing said current time value with a comparison value, and for producing an alarm signal when said current time value and said comparison value have a given numerical relationship.

29. A computer system as recited in claim 28 wherein said comparison value can be loaded by said counter adjustment means.

30. A computer system as recited in claim 29 wherein said alarm is an interrupt signal provided to said CPU.

* * * * *